C. H. SHEASLEY.
COMBINATION MOLD AND SHIPPING CONTAINER FOR LUBRICANTS.
APPLICATION FILED FEB. 15, 1915. RENEWED FEB. 15, 1916.
1,177,451.   Patented Mar. 28, 1916.
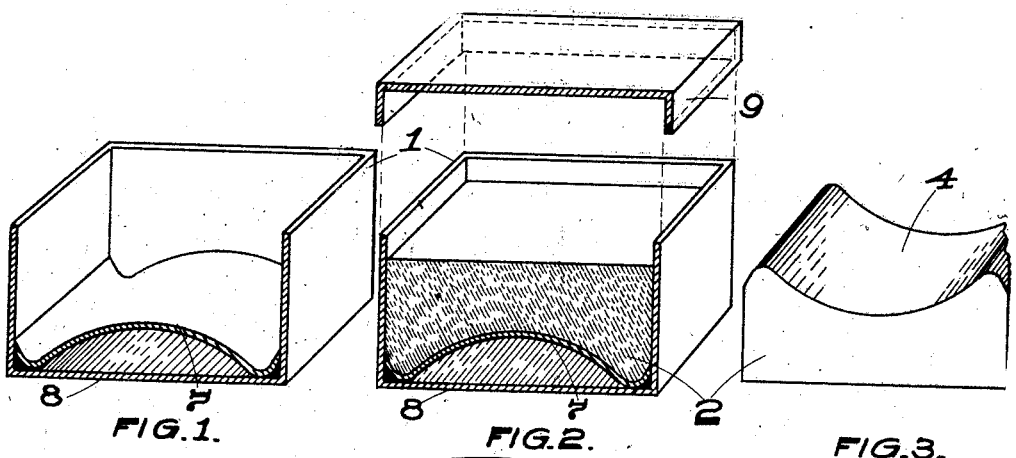
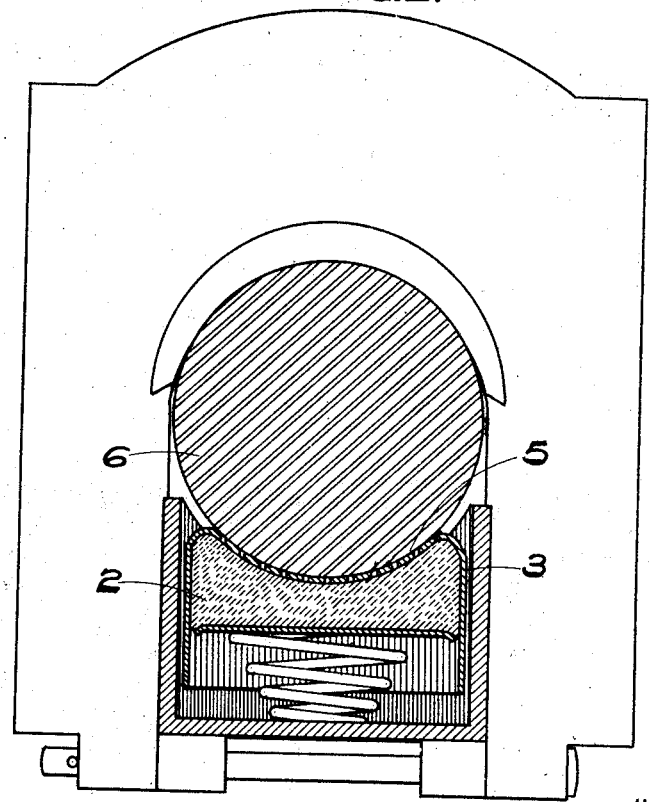
INVENTOR
Charles H. Sheasley
BY
Edw. R. Inman
ATTORNEY

UNITED STATES PATENT OFFICE.

CHARLES HENRY SHEASLEY, OF FRANKLIN, PENNSYLVANIA.

COMBINATION MOLD AND SHIPPING-CONTAINER FOR LUBRICANTS.

1,177,451. Specification of Letters Patent. Patented Mar. 28, 1916.

Application filed February 15, 1915, Serial No. 8,265. Renewed February 15, 1916. Serial No. 78,533.

*To all whom it may concern:*

Be it known that I, CHARLES H. SHEASLEY, a citizen of the United States, residing at Franklin, in the county of Venango and State of Pennsylvania, have invented certain new and useful Improvements in Combination Molds and Shipping-Containers for Lubricants, of which the following is a specification.

The object, construction and utility of this invention are herein set forth with sufficient clearness to enable those skilled in the art to which it most nearly relates, to make and use the same.

The lubricant, for the molding of which this combination mold and container is intended, must be hard in order to be durable and to retain the form in which it is to be applied. Large quantities of such lubricants are used to lubricate the journals or axles of the driving wheels of locomotives, being applied in lubricating devices of the type described in Letters-Patent of the United States No. 818,022, dated April 17, 1906. Heretofore, such lubricant has been supplied by the manufacturers of the same in bulk, and is usually put up for shipment in barrels or other similar containers; the user then shapes the lubricant by means of a press into cakes of suitable form to fit the lubricant container of the lubricating device by means of which the lubricant is practically applied. This pressing method of forming the solid lubricant into cakes not only involves unnecessary labor but in addition thereto it causes waste of material; furthermore, the amount of pressure to which the lubricant must be subjected in order to properly shape it alters the characteristics of the lubricant to its detriment, which alteration is evinced by a continuous and perceptible exudation therefrom of desirable or essential elements.

It is therefore the object of this invention to provide means whereby said lubricant may be properly molded without the application of pressure thereto, and so that the lubricant may be delivered, in the best possible shape and condition, to the consumer for immediate use, and which, at the same time, will be free from the other objections mentioned.

The way in which I attain said objects will now be set forth, reference being made to the accompanying drawings which form a part hereof and in which:—

Figure 1 is a perspective view of my combination mold and shipping container with the end removed to show the construction more clearly; Fig. 2 is a perspective view of said mold and container with its cover, one end of the same being removed to show the lubricant therein; Fig. 3 is a perspective view of a molded cake of lubricant; and Fig. 4 is a transverse section of a lubricating device by means of which the lubricant is applied to the axle of the driving wheels of a locomotive.

In the manufacture of the lubricating material in question, and during and up to the completion of the compounding of same, it is subjected to heat and is in a fluid or semi-fluid state, but solidifies upon cooling. When said compound is in such fluid or semi-fluid state, it is poured into the combination mold and shipping container 1, where it is permitted to cool to a normal temperature and assumes a solidified state.

Fig. 2 shows the container with the lubricant 2 in it, and Fig. 3 shows a cake of lubricant removed from the mold preparatory to placing it into the lubricant receptacle 3 of the lubricating device shown in Fig. 4.

It will be noted that said combination mold and shipping container 1 is, in form, a counterpart of said receptacle 3, so that the cake 2 of lubricant formed therein fits closely into, and conforms truly to the shape of said receptacle 3 of the lubricating device; the principal characteristic of the shape of said molded cake of lubricant is that the cake possesses a cross-sectional or transverse counterpart of the ultimate container and preferably has a concave face, as indicated at 4, to conform to the upper perforated wall 5 of the lubricant receptacle, thus presenting an extended surface to the axle 6, for the efficient application of lubricant thereto. It will be readily noted that, for the purpose of giving to said cake of lubricant said concave surface, said mold 1 is provided with a correspondingly-shaped wall or bottom 7 which is preferably supplementary to the main bottom 8 of the container. The object of said double-bottom construction is to better adapt the mold as a shipping container for the lubricant;

also for the purpose of better attaining this same end, said container is provided with a cover 9, as shown in Fig. 2.

The combination mold and shipping container of the form here shown may be constructed of any suitable material, but that preferably employed is strawboard or heavy paper, which may be stripped from the cake of lubricant and discarded when the lubricant is placed in service.

While the above description is confined to the formation of a cake of lubricant which is, as a whole, a counterpart of its ultimate container, it is equally within the scope of my invention to mold a cake of lubricant which is a cross-sectional or transverse counterpart of the ultimate container, and to cut the same into suitable lengths to be received by said container.

What is claimed is:—

1. A combination mold and shipping receptacle for a filler for the lubricant container of a lubricating device, which filler is normally a solid, said mold and container consisting of a rectangular receptacle adapted to receive said lubricant when in a liquid state, having a convex bottom and being in form a counterpart of said container.

2. A combination mold and shipping receptacle for a normally solid lubricant-filler for the lubricant container of a lubricating device, said mold and receptacle being in form a transverse counterpart of said container, and adapted to receive said lubricant in a fluid state, and to mold the same into a solidified body.

3. A combination mold and shipping receptacle for a normally solid lubricant-filler for the lubricant container of a lubricating device, which mold consists of a rectangular receptacle having a main flat bottom, a supplementary convex bottom, adapted to receive a fluid lubricant and to mold the same into a solidified body which is a counterpart of an ultimate container for said lubricant, and a cover for said receptacle.

In testimony whereof I affix my signature in presence of two witnesses.

CHARLES HENRY SHEASLEY.

Witnesses:
    Mary B. Eckert,
    E. R. Inman.